US006280491B1

(12) United States Patent
Oke (10) Patent No.: US 6,280,491 B1
(45) Date of Patent: Aug. 28, 2001

(54) CARTRIDGE FILTER

(75) Inventor: Simon Forbes Oke, Wingfield (AU)

(73) Assignee: Ozone Manufacturing Pty Ltd., Wingfield (AU)

( * ) Notice: Subject to any disclaimer, the term of this patent is extended or adjusted under 35 U.S.C. 154(b) by 0 days.

(21) Appl. No.: 09/367,057

(22) PCT Filed: Feb. 9, 1998

(86) PCT No.: PCT/AU98/00065

§ 371 Date: Aug. 6, 1999

§ 102(e) Date: Aug. 6, 1999

(87) PCT Pub. No.: WO98/34711

PCT Pub. Date: Aug. 13, 1998

(30) Foreign Application Priority Data

Feb. 7, 1997 (AU) .................................................... PO4996

(51) Int. Cl.$^7$ .................................................. B01D 46/00
(52) U.S. Cl. ................................ 55/300; 55/302; 55/304; 55/323; 55/324; 55/332; 55/482; 55/484; 55/473
(58) Field of Search .......................... 55/300, 302, 304, 55/305, 320, 323, 324, 327, 332, 482, 484, 486, 471, 473

(56) References Cited

U.S. PATENT DOCUMENTS

| 2,013,038 | * | 9/1935 | Dollinger | 55/484 |
| 2,908,348 | * | 10/1959 | Rivers et al. | 55/484 |
| 3,149,940 | * | 9/1964 | Wachter | 55/332 |
| 4,204,846 | * | 5/1980 | Brenholt | 55/304 |
| 4,359,330 | * | 11/1982 | Copley | 55/324 |
| 4,502,874 | * | 3/1985 | Levie et al. | 55/300 |
| 4,545,792 | | 10/1985 | Hüttlin | 55/241 |
| 4,560,396 | | 12/1985 | O'Dell | 55/287 |
| 4,629,482 | | 12/1986 | Davis | 55/385 |
| 5,156,660 | * | 10/1992 | Wilson | 55/304 |
| 5,223,011 | * | 6/1993 | Hanni | 55/484 |
| 5,240,486 | | 8/1993 | Springmann et al. | 55/320 |
| 5,279,629 | * | 1/1994 | Stueble | 55/323 |
| 5,512,074 | * | 4/1996 | Hanni et al. | 55/484 |
| 5,803,954 | * | 9/1998 | Gunter et al. | 55/484 |

FOREIGN PATENT DOCUMENTS

| 3335999 A1 | 4/1985 | (DE) . |
| 6-5216 | 1/1994 | (JP) . |
| 2057574 | 4/1996 | (RU) . |

OTHER PUBLICATIONS

Derwent Abstract Accession No. 97–019321/02 (Shtekhman BV), Oct. 4, 1996.

* cited by examiner

Primary Examiner—Duane S. Smith
(74) Attorney, Agent, or Firm—Finnegan, Henderson, Farabow, Garrett & Dunner, L.L.P.

(57) ABSTRACT

An apparatus for separating and filtering pollutants from a fluid flow by using inertia to separate a proportion of the pollutants from the fluid flow passing through a constricted passage between a pair of filter elements to an outlet between the filter elements. The constricted passage causes the major portion of the fluid flow to be diverted to pass through the filter elements to the outlet in a direction whereby the filtered fluid flow exits into the outlet of the constricted passage. The apparatus also includes a device to periodically clean the filter elements whilst in position in the apparatus.

16 Claims, 10 Drawing Sheets

CARTRIDGE FILTER

This invention relates to a cartridge filter, more particularly to a filtering unit utilising a cartridge filter which has an integral inertial separator for use in pollution control products to separate various pollutants such as fumes, dusts, gases, mists and debris from a flow of fluid, followed by filtering of the fluid and cleaning of the filtering elements

BACKGROUND OF THE INVENTION

Throughout the specification and claims, the term "separation" means the removal of pollutants from a fluid flow by velocity or direction change of the fluid flow or by centrifugal action, while "filtration" means the removal of pollutants from a fluid low by the fluid passing through a porous medium to remove the pollutants by a filtering action.

Various filtering units are known for filtering pollutants from a flow of air, these including horizontally rotating self cleaning cylindrical filter elements, vertically positioned cylindrical units with vibrational self cleaning, corrugated vertically positioned self cleaning filter units with the air flow being radially inwardly of the filter, cylindrical filters with radially outward flow, horizontally mounted cartridge filters with air cleaning, vertical cartridge filters with pulse jet cleaning by temporarily reversing the flow of air, and conical vertically orientated pleated filter elements.

Also there are various units with an independent inertial separator such as a cyclone connected by duct or connection to an independent chamber containing a filter.

Also U.S. Pat. No. 5,240,486 discloses a condensate separator for separating liquids from gases in which the gas flows into a first element end exits via a transverse port into a separator cavity where the liquid, that is formed by condensation due to the change of gas flow direction is collected. The first element has a funnel shaped end which assists in changing the gas flow direction, the funnel being placed immediately in front of the entry into the second element.

Also JP 60005216 shows a dust collector having an intake pipe vertically introduced into a cylinder having a funnel-shaped lower portion and has its lower end opened into the cylinder. The discharge pipe is positioned in the cylinder above the lower end of the funnel, which is designed in an inverted frustoconical form.

Attention is also directed to RU 2,057,574 which illustrates an example of inertia separation of particles from a fluid stream.

However as far as is known none of the prior art filtering or particle separation machines have inertial separation as an integral part of a cartridge filter housing.

Thus it is an object of the invention to provide a filter or separation unit which will overcome one or more of the disadvantages of the prior art.

Another object of the invention is to provide a filter cartridge of generally cuboid shape including inertial separation and filtering of the fluid flow.

A further object of the invention is to provide a cartridge housing which houses filter elements wherein the housing has an inertial separator which is an integral part of that housing and which is positioned between the filter elements.

Also it is an object of the present invention to provide a filtering unit in which there is separation of the larger particles by inertia and change of direction of the flow before the flow passes through the filter elements.

A further object of the invention is to provide the filtering elements as pleated elements which are cleaned from the clean side of the filter element by either vibration and/or air jet blast.

A still further object of the invention is to provide means where during operation of the unit the lower portion of the filter elements are closed, at other times are not closed to allow for the free fall of the filtered material to pass into a collection area.

Another object of the invention is to provide a separation and filtering unit in which there are two stages of inertial separation prior to two stages of filtration of a fluid flowing through the unit.

BRIEF DESCRIPTION OF THE INVENTION

In order to overcome one or more of the above objects there is provided according to the invention a filter cartridge for the separation and filtering of pollutants from a fluid flow, said cartridge being adapted to be positioned in a chamber beneath a central opening in an upper surface of said chamber, said cartridge being cuboid in shape and having means for directing a major proportion of said flow through a spaced pair of generally vertical planar filtering elements on two sides of said cuboid shape whereby said fluid flow passes through said filtering elements in a direction toward each other to a horizontal outlet situated adjacent said space between said planar filtering elements in a vertical wall of said chamber.

Also there is provided according to the invention a filter cartridge for the separation and filtering of pollutants from a fluid flow, said cartridge being adapted to be positioned in a chamber having a central vertical inlet in an upper surface of said chamber, said filter cartridge having an integral constricted passage passing through the contre of said cartridge adjacent at least one generally vertically positioned filter element, whereby by inertia a major proportion of the pollutants pass through the constricted passage downwardly from the central inlet while a major proportion of the fluid flow passes over the at least one filter element to release by inertia further pollutants before passing through the filter element in the filter chamber to an outlet adjacent to but separate from said constricted passage.

Thus the separation occurs before the air or gas flow passes to a pair of filtering elements with high flow rates with one cartridge in one chamber as well as a top inlet with a side outlet direct into the eye of the rotor to thus produce a compact machine, and in addition to having all the filtering surfaces vertical so that no pollutant reservoir is formed on the filter surface.

DESCRIPTION OF THE DRAWINGS

In order to more fully describe the invention reference will now be made to the accompanying drawings in which:

FIG. 3 is a view of a further form of the invention of greater filtering capacity, FIGS. 4(a),(b),(c) are plan, front elevation and side elevation of the unit of FIG. 1, FIGS. 5 (a), (b), (c) are plan, front elevation and side elevation of the larger capacity unit of FIG. 3, FIG. 6 (a) shows the air flow and (b) shows the discharge of the pollutants during cleaning of the filters.

DESCRIPTION OF THE PREFERRED EMBODIMENT

Referring to FIGS. 1 to 4, the filter unit 1 comprises a chamber 2 having a vertical inlet 3 and an outlet passage 4. Within the chamber 2 there is positioned a filter housing 5 carrying filter elements 6 on opposite sides thereof. The filter housing 5 is more fully shown in FIG. 2, the filter element being removed to show the interior of the housing. The filter housing is formed with two oppositely directed portions 7 each adapted to hold a filter element in a holder 8. Each portion 7 opens into an outlet area 9 the edges of which seal on the chamber for the extraction rotor 11 having an opening for the passage of the air directly into the eye of the rotor 11. The two portions 7 are separated by a sloping wall 12 which slopes from the top portion 13 away from the rotor 11. The side walls 14 also slope towards each other and then extend downwardly to thus form a funnel 19. Backing bars 25 are positioned across the area 9 directly adjacent the filter element on the outlet side of the filter element, the bars 25 preventing undue flexing of the filter element due to differential pressure across the filter element.

Figure 1:
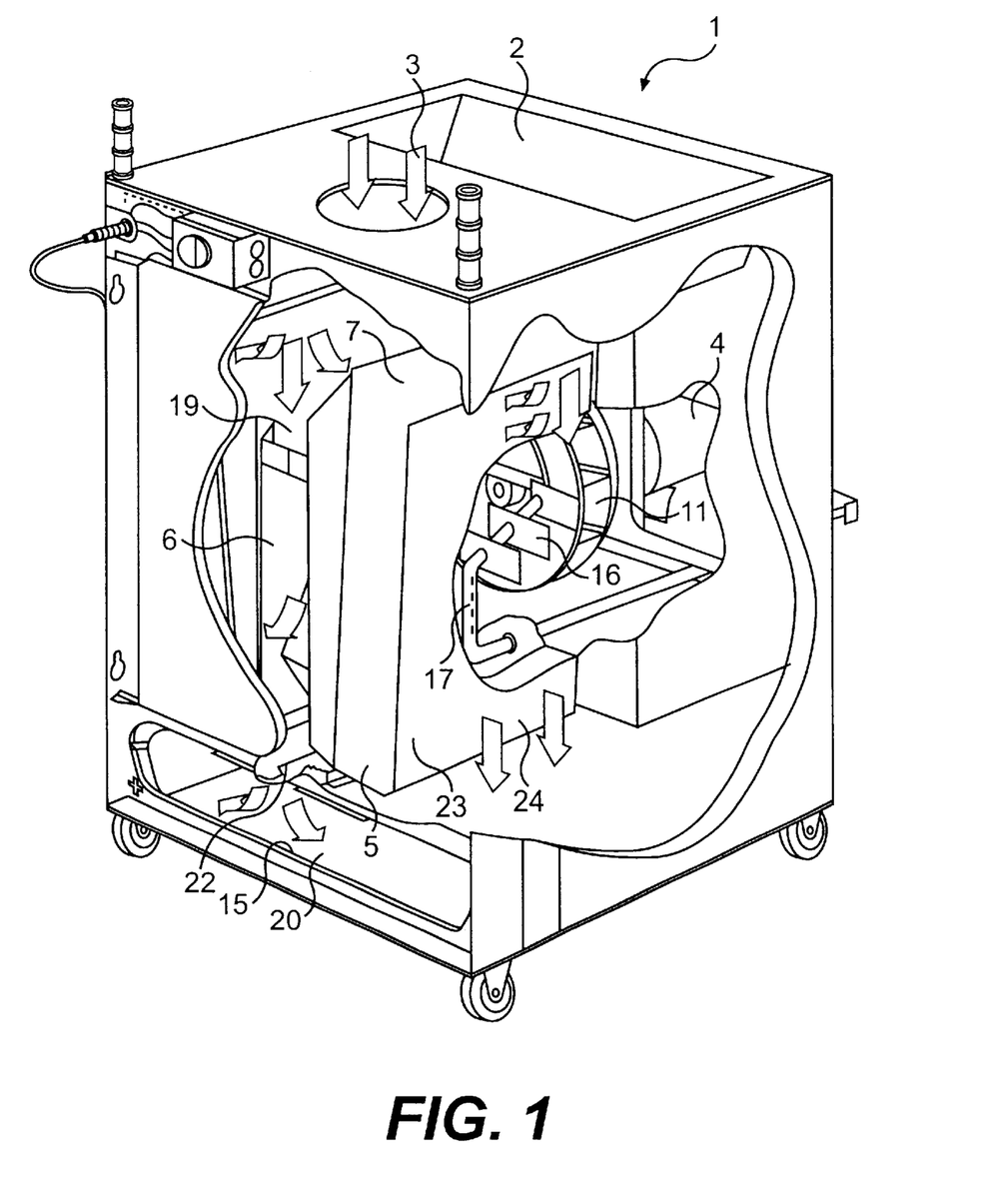
FIG. 1 is a perspective view of one filter unit with various portions cut away to more fully show the internal features of the invention.
Figure 2:
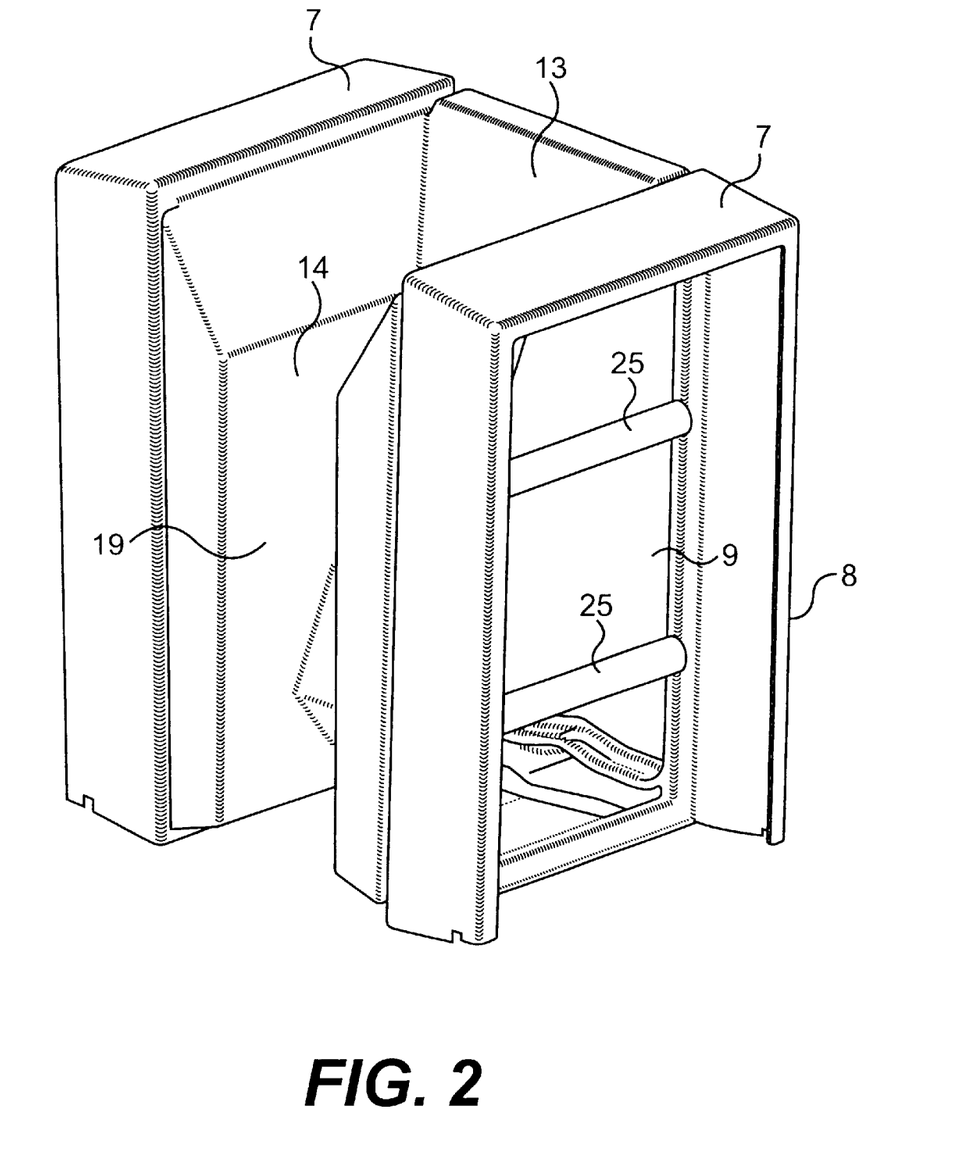
FIG. 2 is a perspective view of the cartridge housing of the filter unit of FIG. 1.

As shown in FIG. 1 the inlet 3 opens into the area between the walls 13 and 14 and thus a funnel shaped passage 19 is produced decreasing in cross-sectional area in the downward direction. The filter housing is positioned adjacent to but spaced from the bottom 15 of the chamber which area 20 can contain dust, debris and pollutant collection means such as pans, drawers, bins or other collection means for the quick and easy removal of the collected pollutants.

Figure 3:
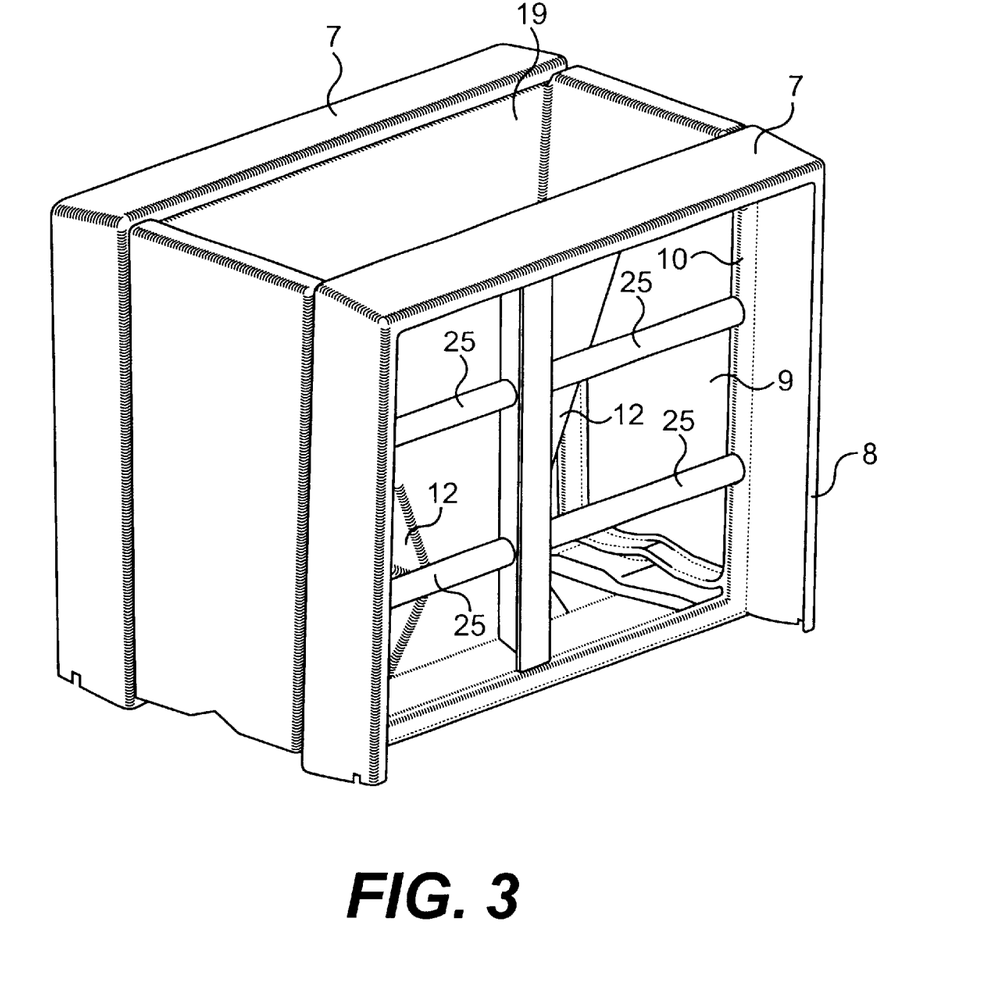
Figure 9A:
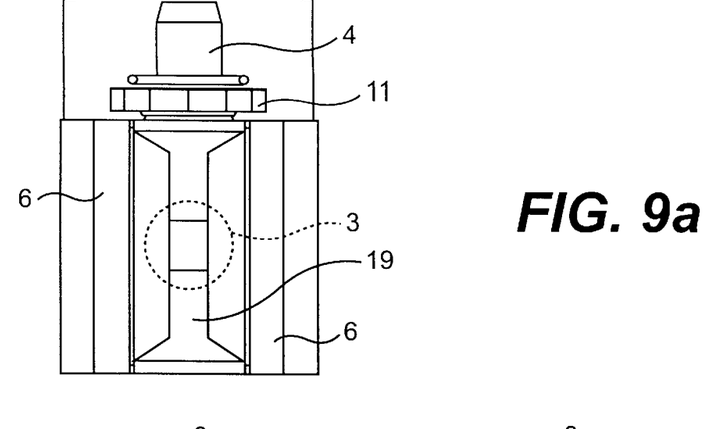
FIG. 9 shows an arrangement of two units stacked one on the other.
Figure 9B:
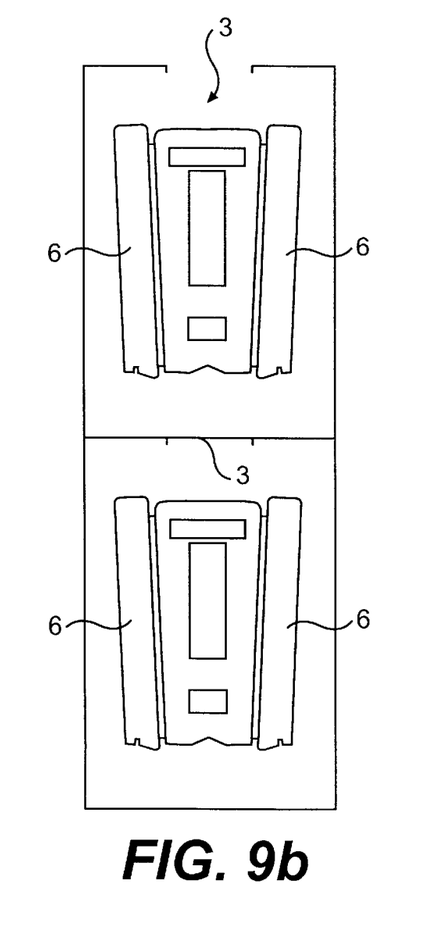
Figure 9C:
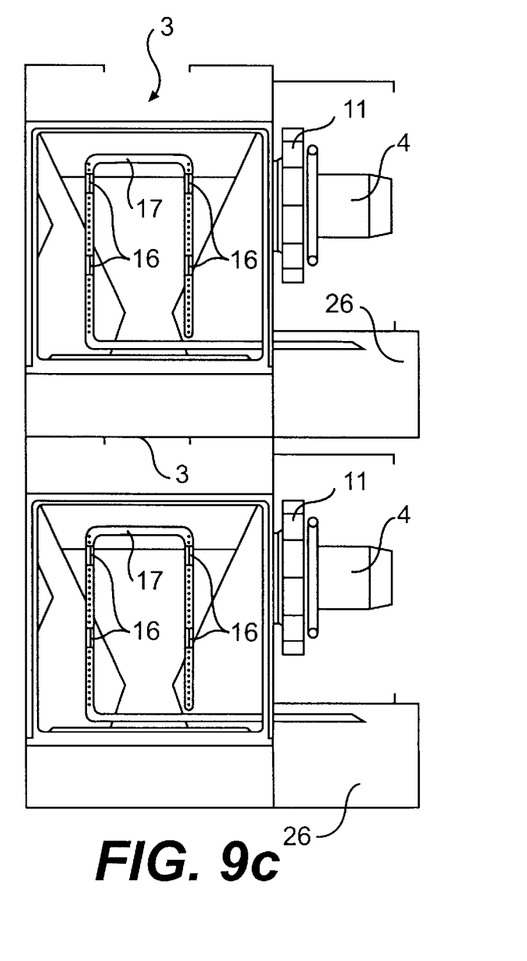

FIG. 3 shows an alternate form of the invention which comprises two filter housings positioned adjacent each other to thus double the capacity while FIG. 9 illustrates a further example where one unit is positioned on top of a lower unit. These may be either the single unit of FIG. 2 or the double unit of FIG. 3.

Figure 6A:
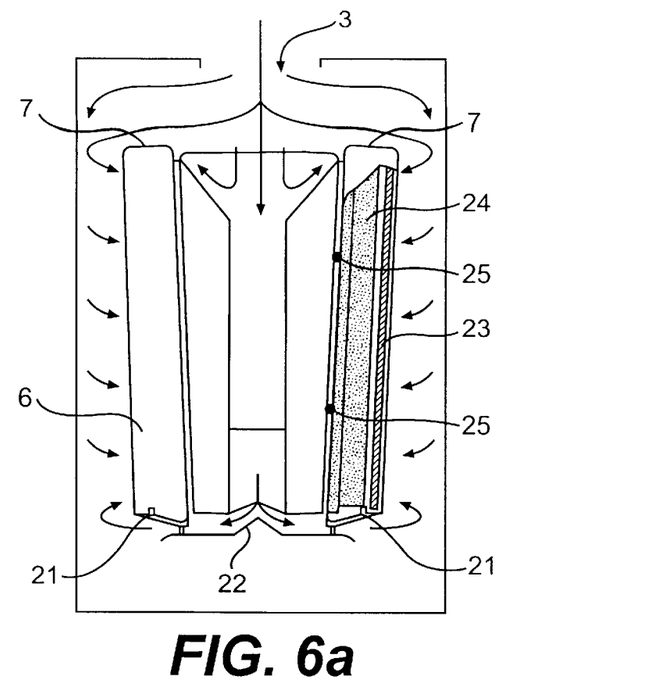

As shown in FIG. 6, the major portion of the air will divide with a change of direction to pass over the tops of the portions 7 into the space between the filter elements 6 and the side walls of the chamber with the major portion of the pollutants passing downwardly through the funnel 19. There is then a further change of direction of the air through 90° to pass through the filter elements 6 into the outlet area 9 and directly into the eye of the rotor whilst pollutants pass downwardly between the filter elements 6 and the side walls of the chamber.

Figure 8:
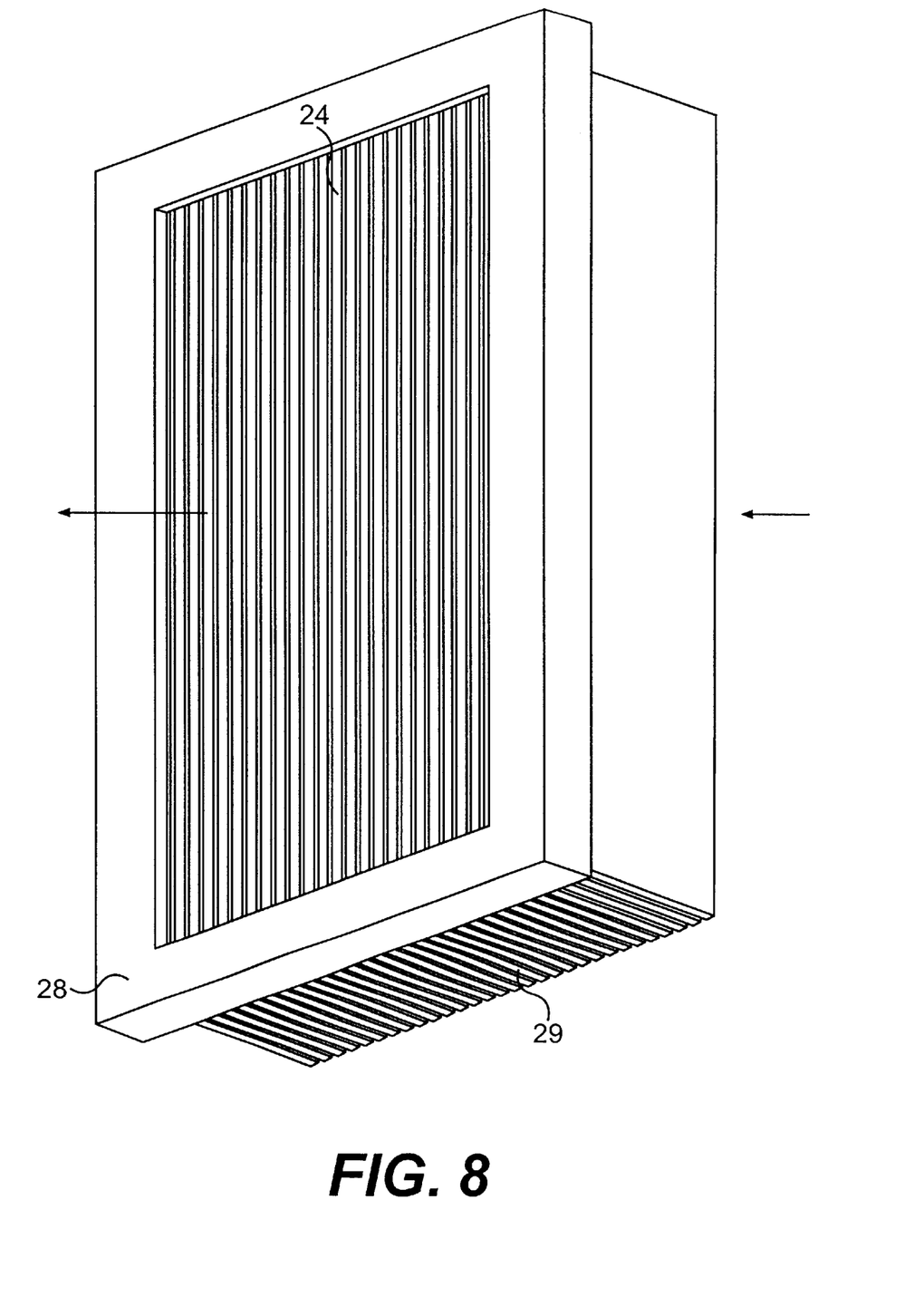
FIG. 8 shows one of the filter elements.

Each of the filter elements 6 are preferably pleated filters of known construction. The filters are arranged with the vertical pleats 24 when viewed face on, but are inclined so that the filters converge to each other in the downward direction as shown in FIG. 6. While the folds of the pleats are sealed, the bottom of each filter element is not mounted in a frame or housing but are thus virtually free on the inlet side as shown at 29 as shown in FIG. 8, there being no support at the bottom of the pleats, the advantage of which will be explained later in the specification. The filter element has a gasket 28 on the outlet side of the filter element, the fold or pleats extending upstream of the gasket. Thus the pleats are unsupported by the cartridge housing on the inlet side of the filter element.

If desired a microscreen 23 may be positioned on the inlet side of the filters, so that only the finest particles will pass through the microscreen to be filtered by the pleated filter. This microscreen is mounted in the housing behind flanges 8 and can be positioned on at least three different spacings from the surface of the pleated filter, depending on the particular filtering requirements.

Figure 4A:
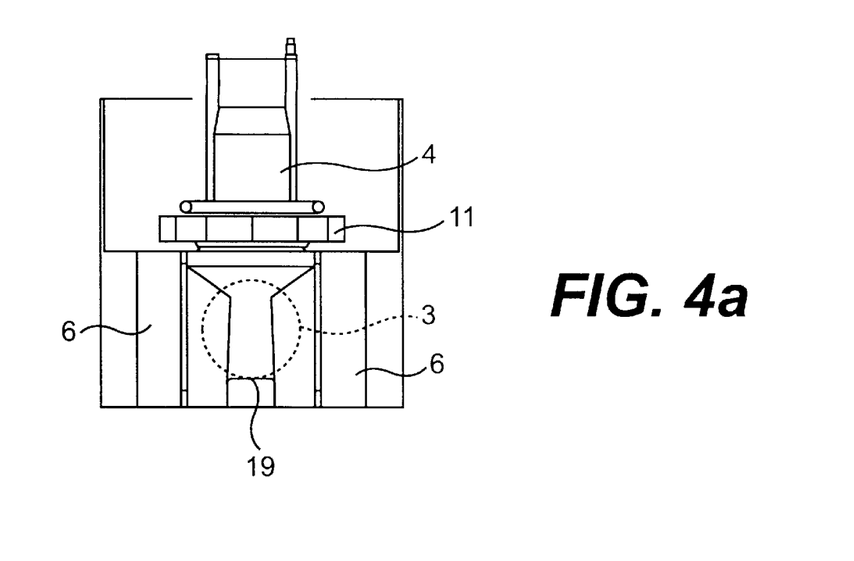
Figure 4B:
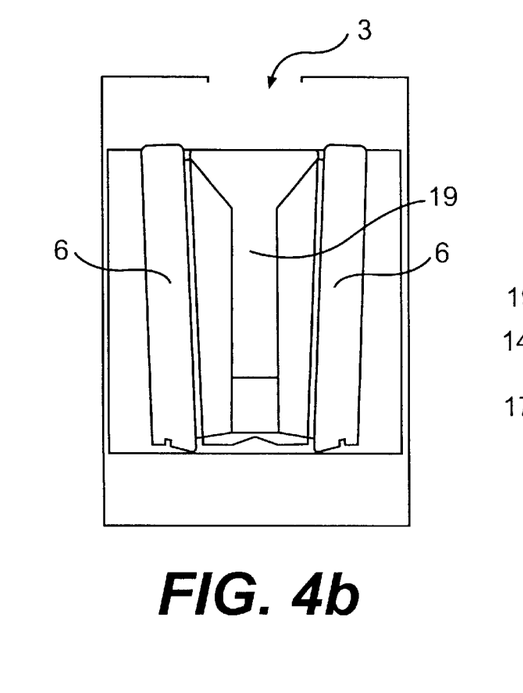
Figure 4C:
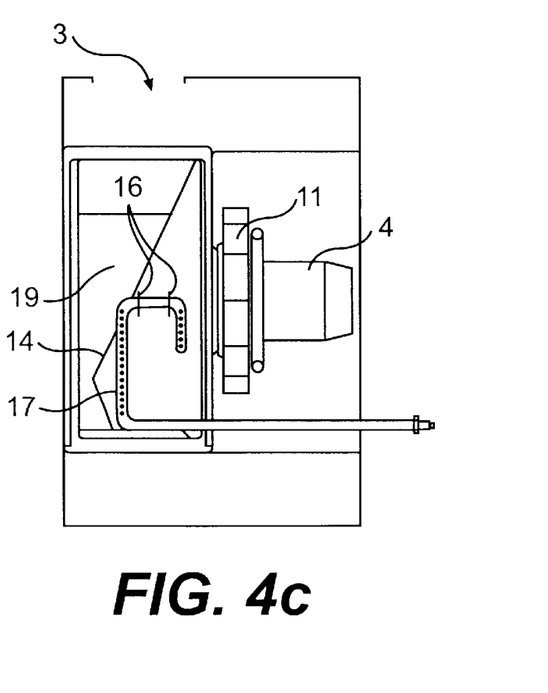
Figure 5A:
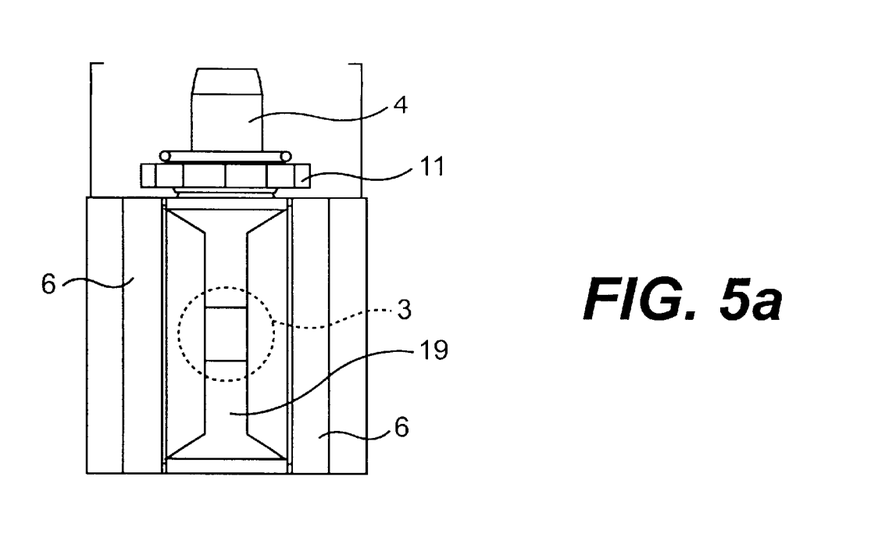
Figure 5B:
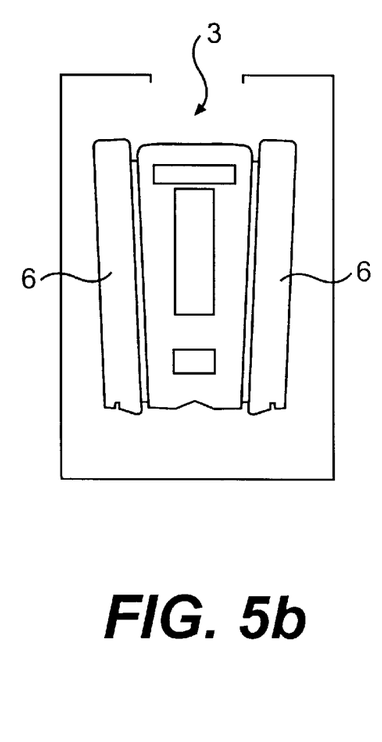
Figure 5C:
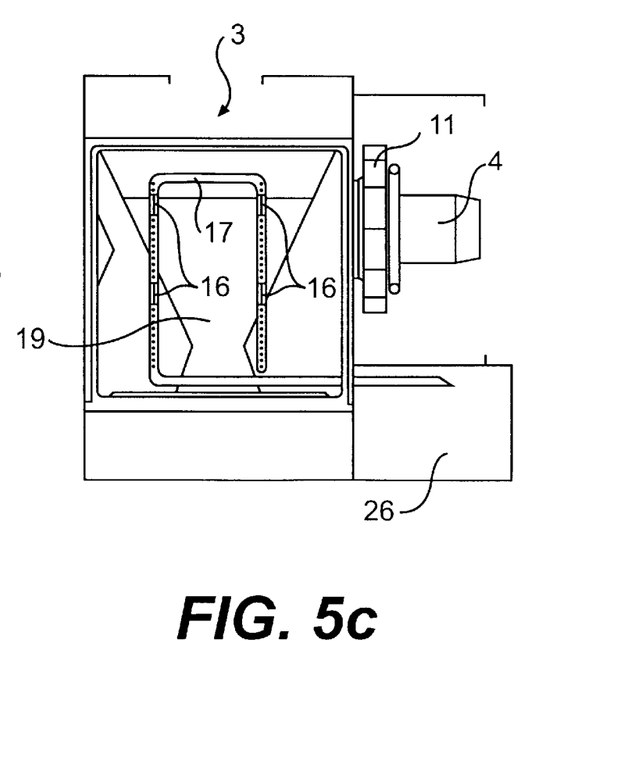
Figure 7:
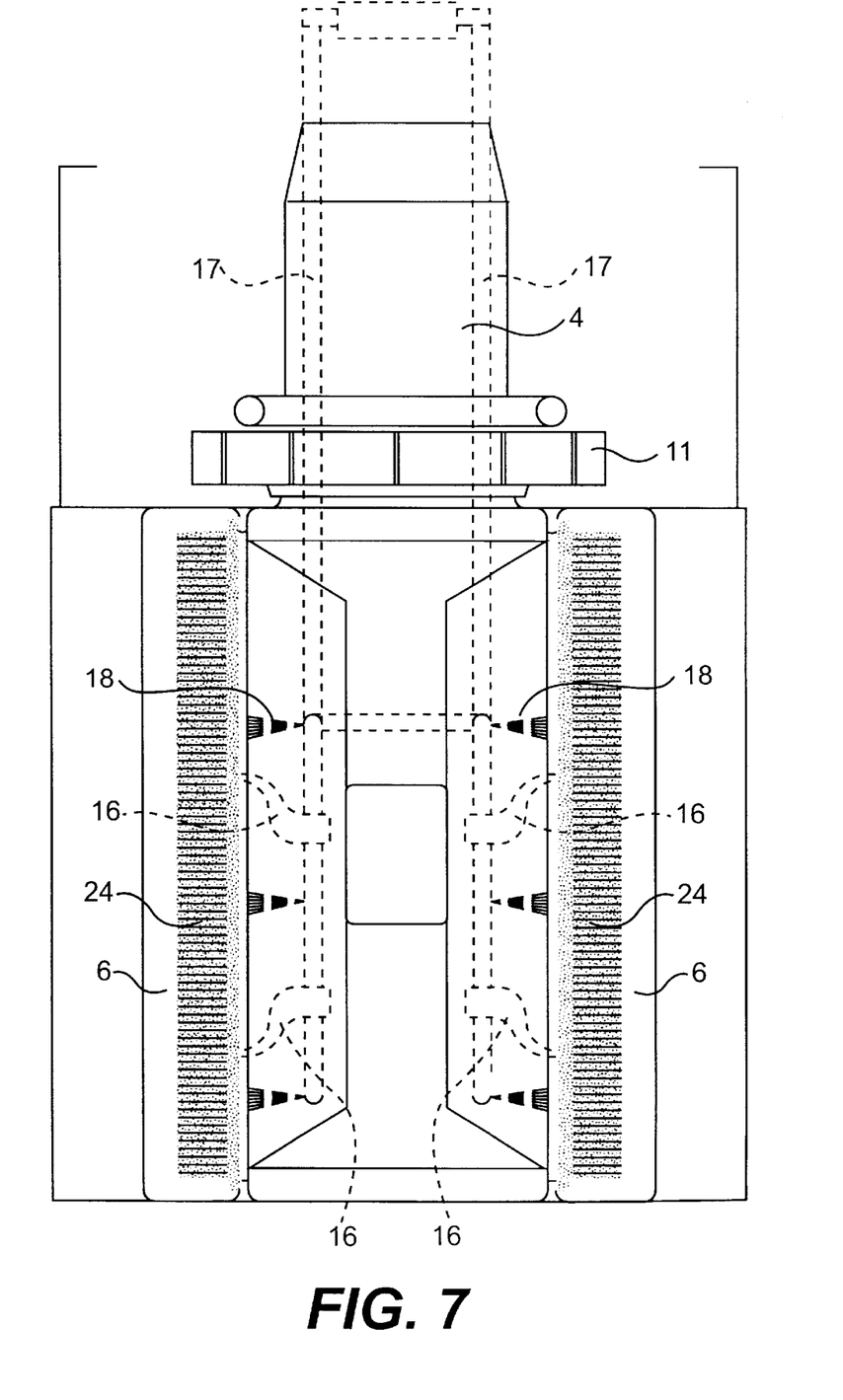
FIG. 7 shows in plan the cleaning of the filters.

It is preferred that a cleaning system be provided in the unit. Thus as shown in FIG. 7 the filter can be cleaned from the clean side of the filter elements by cleaning fingers 16 on a rod 17, the fingers being positioned to brush or rub across the pleats. Preferably the fingers are elastomer flickers which contact each pleat to vibrate each pleat The rod can be manually actuated as illustrated in FIG. 4 or can be driven by power means, either automatically or as desired as illustrated in FIG. 5. The box 26 can contain an air compressor to provide the air flow through the rod to jet holes as well as a drive motor to move the rod back and forth across the pleats. The rod extends from the exhaust side of the unit and thus passes into the chamber and agitates the pleats. Due to the fact that the pleats are free at the bottom, the pleat will vibrate along its whole length thus dislodging the debris collected on the dirty side of the filter elements. Due to the fact that the filter has the above described incline, the dislodged material will fall directly to the collection area and not pass down the filter surface itself. Also the pleats are free at the bottom and so do not have a reservoir formed by a flange at the bottom. The microscreen 23 is spaced from the pleats and thus the pollutants can freely fall down this gap. The rod is preferably hollow and provided with the small holes facing the filter surface as in FIGS. 4, 5 and 7 so that a blast of air 18 can be passed through the rod to thus vibrate the pleats to clean the filter. The air cleaning may be in combination with the mechanical cleaning, or the cleaning may be by air blast only.

Figures 10, 10A:
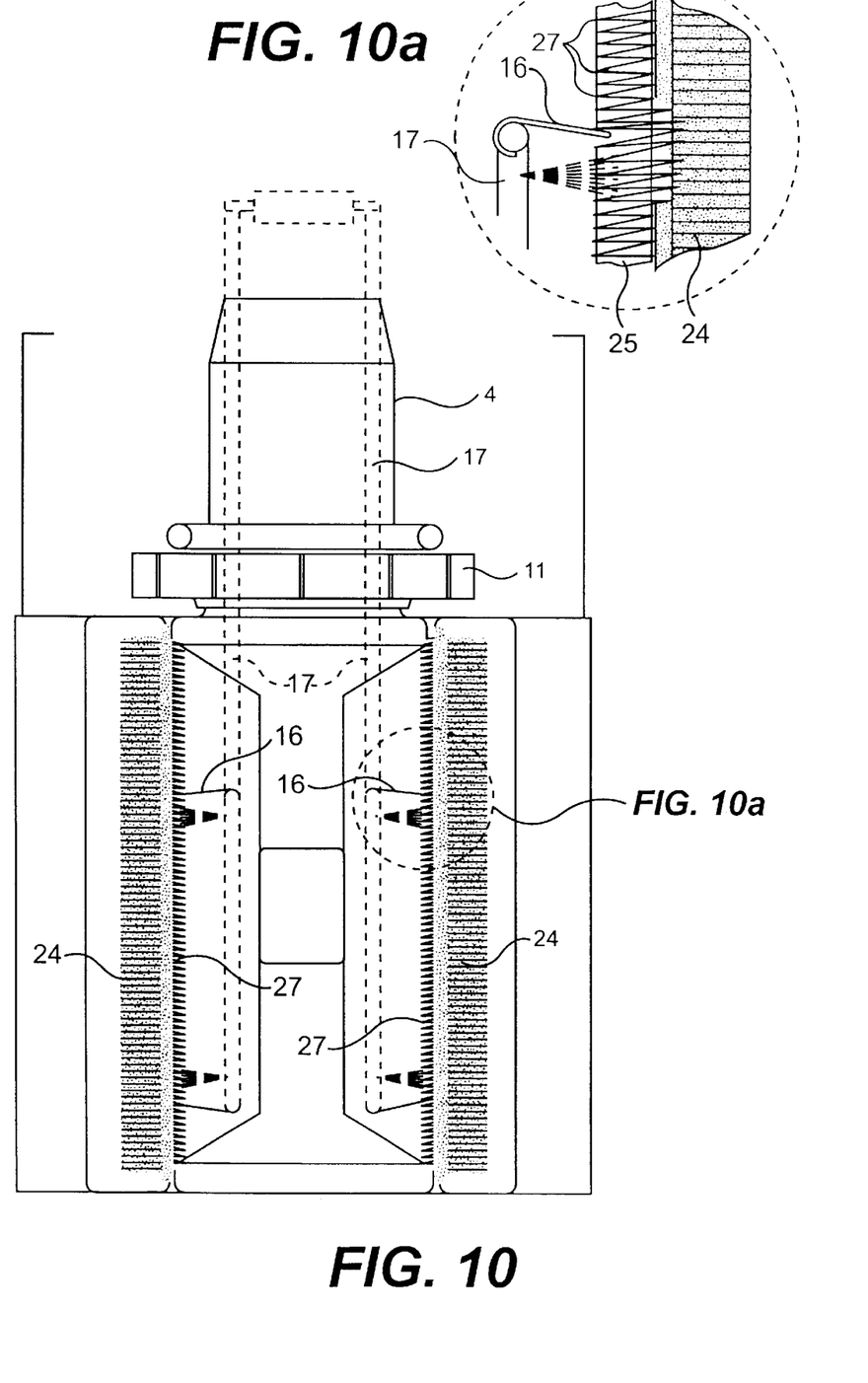
FIG. 10 illustrates an alternate means for cleaning the filters.

Turning now to FIG. 10, there is illustrated a further way of cleaning the filters. A coil spring 27 is positioned on each of the backing bars 25, the coil spring being coiled into the pleats so that there is a pleat on each side of a coil. The rod 17 has a relatively rigid flicker 16 to partially penetrate between the coils and the backing bar is provided with a flat surface facing the flicker. Thus as the flicker passes over the coils spring, each coil is rapidly deflected, which intum rapidly deflects or vibrates the pleats engaged by the coil. Thus as the flicker quickly moves over the coil spring, the pleats of the filter element are vibrated to dislodge the accumulated pollutants. Due to the fact that the coils engage between the pleats there is little or no wear on the pleats. If the flicker wears it can easily be replaced on the rod.

Figure 6B:
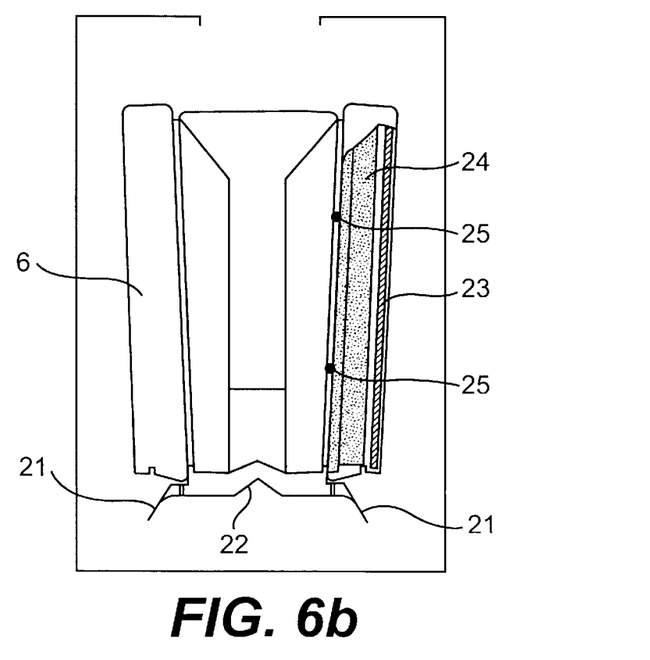

Referring to FIG. 6, at the bottom of each filter element there is a valve or flap 21 which is hinged to close the gap between the bottom of each filter element and the microscreen when the unit is in operation. However when the unit is at rest, the flap 21 hangs downwardly as shown in FIG. 6(*b*) to open this gap and be free of the bottom of the filter element.

Thus when the unit is not in operation and the filter elements are cleaned as above described, the debris and pollutants removed are free to fall down between the filter element and the microscreen into the collection pans or the like. When the unit is in operation the air flow passes down the passage 19 and turns right and left at the deflector 23 and then across under the filter elements to cause the flaps or valves to be raised and be positioned against the bottom of the filter elements closing off the bottom of the filter elements and thus directing the air flow which passes under the bottom of the filter elements to be directed upwardly and then through the filter elements.

Thus it is to be noted that in the first instance the air is directed downwardly through the funnel and passes though the filter housing. This initial flow from the inlet is of relatively high velocity and bleed air at the bottom outlet of the funnel causes inertial separation of the heavier particles in the air stream due to the velocity of the air stream and by gravity, there being a relatively high pressure drop. Thus as the major portion of the air has to turn through up to 180° further separation of the particles in the air stream occurs due to the inertia of the particles in the high velocity air stream. As a guide 20% of the air passes down the funnel and 80% over housing part 7 with 80% of the pollutants passing down the funnel and 20% of the pollutants over part 7 of the housing.

Also it is to be noted that with the air flow passing through the filter cartridge housing and then dividing, to pass through two separate filters high flow rates of filtration are available as there are provided two filter elements in one filtering chamber. As noted above with the pleats of the filters being vertical, and inclined there is provided free flow of the filtered pollutants down to the collection chamber beneath the filter cartridge. As the air flows across the top of the respective part 7 of the housing with high velocity and changes direction to flow downwardly and then changes direction again to flow through the filter cartridge further separation occurs and separation occurs when the air stream impinges on the inside side walls of the chamber.

Observation has shown that there is little turbulence of the air at the bottom of the chamber and in the debris collection area so that the filtered debris is not caused by turbulence to again enter the filtering air stream. The deflector forces the air to the right and the left after it leaves the funnel which keeps the air streams away from the pollutants settled in the bottom of the chamber.

The microscreens 23 are positioned before the pleated elements to filter out fibres and other "pleat unfriendly" pollutants during extraction, but with the microscreen being spaced by a gap from the surface of the cartridge filter pleats, so that the pollutants can be expelled during the cleaning cycle. There are alternate positions for the microscreen, from being positioned virtually adjacent the pleats of the cartridge, to being spaced therefrom, and pre-filter media can be attached to the microscreens for special applications eg. coalescing. During operation, the flow of fluid through the microscreens causes each to vibrate and so are self cleaning.

Thus it will be seen that there are two separate stages, one of separation and the other of filtering. As described above there are two separate stages of inertial separation, the first when the major inertial separation occurs with the major proportion of the pollutants passing through the constricted passage, and the second separation occurring when the fluid passes over the filter elements and then turns to pass through the filter elements. The filtering occurs in two stages, the first being the microscreen filter and the second as the fluid passes through the pleated filters.

As noted above the valves or flaps are in the open position during the cleaning cycle, so that the dislodged pollutants fall freely into the collection chamber. Even when the unit is idling, that is running but not actually filtering, the valves or deflectors are in the position to close the bottom of the filter cartridges and in this condition of operation of the unit there is little turbulence of the air, and thus the collected pollutants in the collection chamber are not disturbed to any great extent.

When it is necessary to remove the cartridges, they are removed from the front, that is the end opposite to the outlet end of the unit. The cleaning rods extend from the back of the unit into the area 9 of the filter housing, and thus the cartridge filters can be removed without being obstructed by any cleaning mechanism, the opening for the removal of the cartridges being as large as required. The cleaning system flicks the pleats from the clean side and the whole pleat vibrates due to the free fall pleat construction. The cleaning can be manually actuated or electrically or pneumatically. If desired the cleaning can be by air pressure jets which are moved across the pleats form the clean side, thus vibrating the pleats with virtually no damage to the pleats, which is in contrast to pulse cleaning. Also there may be a combination of the mechanical flicking of the pleats and air blast cleaning.

The filter chambers can be manufactured to hold filter cartridges in end to end relationship on each side and also vertical stacking of the filter chambers is also possible. Further for large pollutants a deflector can be positioned as a "cap" over the top of the funnel.

As noted above there is described two forms of the cartridge, the second being of larger filtering capacity than the first. The larger unit has double the filtering capacity of the smaller unit and comprises two of the small filter housing assembled in back to back relationship. When comparing FIGS. 2 and 3, it can be seen that the larger unit as shown in FIG. 3; is in fact two of the units of FIG. 2. Thus the funnel 19 on the smaller unit is asymmetrical while the funnel in the larger unit is symmetrical.

The housings can be made of metal or moulded plastic or other suitable material. The larger housing can be assembled or manufactured in three ways. Thus two of the smaller filter housings may be pushed together, they may be glued or fastened together, and finally by having a large housing moulded of plastic.

While one form of the invention has been described in some detail, the invention is not to be limited thereto but can include variations and modifications falling within the spirit and scope of the invention.

What is claimed is:

1. An apparatus for separating and filtering pollutants from a fluid flow comprising a chamber having a central vertical inlet in an upper surface of the chamber, a horizontal outlet opening into a vertical wall of the chamber, and a filter cartridge mounted within the chamber, the filter cartridge comprising a cuboid shaped cartridge having a spaced pair of filtering elements, and means to direct air fluid flow through said filtering elements in a direction toward each other to said outlet positioned between said filtering elements.

2. An apparatus for separating and filtering pollutants from a fluid flow comprising a chamber having a central vertical inlet in an upper surface of the chamber, a horizontal outlet opening into a vertical wall of the chamber, and a filter cartridge mounted within the chamber, the filter cartridge being a cuboid shaped cartridge having a spaced pair of filtering elements, the inlet opening to a constricted passage between the pair of filtering elements, the major portions of the pollutants passing between the filtering elements to said outlet, the constricted passage diverting the major portion of the fluid flow to pass through the filter elements to said outlet.

3. The apparatus of claim 1 or 2 wherein said filtering elements have a plurality of vertical pleats, said apparatus including a cleaning unit which vibrates the vertical pleats whereby the displaced material falls to a collection means beneath the filter elements.

4. The apparatus of claim 3, wherein the cleaning unit vibrates the pleats on the exhaust side of the filtering elements.

5. The apparatus of claim 5, wherein said cleaning unit comprises at least one resilient element engaging the pleats, and means for moving the resilient element across the filtering elements.

6. The apparatus of claim 5, wherein the at least one resilient element is manually moved across the filtering elements.

7. The apparatus of claim 5, wherein the at least one resilient element is driven across the filtering elements by a control motor.

8. The apparatus of claim 5, which includes means to project at least one jet of air against the filter elements to assist in the displacement and removal of from the filtering elements, said at least one jet of air moving with the resilient element.

9. The apparatus of claim 1 or 2, wherein said filter elements have a plurality of vertical pleats, said apparatus including a cleaning unit which projects at least one jet of air against the vertical pleats to displace and remove pollutants from the vertical pleats, and means for moving the said at least one jet of air across the filter elements.

10. The apparatus of claim 3, wherein said filtering elements include backing bars positioned on the exhaust side of the filtering elements to limit deflection of the filtering elements due to the flow of fluid therethrough, said cleaning unit including a plurality of spring coils positioned on said backing bar and engaging between at least each pleat of the filtering elements, and means for rapidly displacing each coil towards one of its neighbor to thereby displace and vibrate the pleats of the filtering elements.

11. The apparatus of claim 2, wherein the constricted passage comprises a funnel shaped passage formed by the walls of the cartridge extending adjacent one filter element, whereby the return filtered fluid flow passes to the outlet in the chamber adjacent to but separate from said constricted passage.

12. The apparatus of claim 11, wherein the cartridge has two spaced filter elements one on each side of said funnel shaped passage, said funnel shaped passage being spaced from said filter elements whereby fluid flowing through said filter elements passes to the outlet.

13. The apparatus of claim 11, which includes a deflector plate positioned beneath and spaced from a bottom outlet of said funnel shaped passage and said filter elements, whereby fluid flowing through said funnel shaped passage is redirected by a deflector across and underneath the filter elements and upwardly to pass through the filter elements.

14. The apparatus of claim 13, wherein said deflector plate includes hinged flaps positioned beneath each filter element and closing against each filter element, said flaps during operation being maintained closed by the flow of fluid thereunder, said flaps when the flow ceases, opening to permit the deposit of pollutants removed from the filters into receptacles positioned below the filter elements.

15. The apparatus of claim 3, wherein a microscreen filter is positioned adjacent to but spaced from the inlet side of each of the vertically pleated filtering elements to remove pollutants before the fluid flow enters the vertically pleated filtering elements.

16. The apparatus of claim 3, wherein each said filter element is mounted in a frame on the inlet side of the filter, the pleats being unsupported at the inlet or upstream side of the filter element, so that the pleats are free to be deflected to permit the displaced pollutants to fall below the filter element into collection receptacles.

* * * * *

UNITED STATES PATENT AND TRADEMARK OFFICE
CERTIFICATE OF CORRECTION

PATENT NO. : 6,280,491 B1
DATED : August 28, 2001
INVENTOR(S) : Simon Forbes Oke It is certified that error appears in the above-identified patent and that said Letters Patent is hereby corrected as shown below:

<u>Column 7, claim 8,</u>
Line 12, insert -- pollutants -- between "of" and "from".

Signed and Sealed this

Second Day of April, 2002

Attest:

Attesting Officer

JAMES E. ROGAN
*Director of the United States Patent and Trademark Office*